United States Patent [19]

Arab-Sadeghabadi et al.

[11] Patent Number: 5,448,058

[45] Date of Patent: Sep. 5, 1995

[54] OPTICAL SIGNAL DETECTION APPARATUS AND METHOD FOR PREVENTING POLARIZATION SIGNAL FADING IN OPTICAL FIBER INTERFEROMETRIC SENSOR SYSTEMS

[75] Inventors: Akbar Arab-Sadeghabadi, Simi Valley; Karlheinz vonBieren, Camarillo, both of Calif.

[73] Assignee: Litton Systems, Inc., Beverly Hills, Calif.

[21] Appl. No.: 53,002

[22] Filed: Apr. 27, 1993

[51] Int. Cl.[6] .................................... G02F 1/01
[52] U.S. Cl. ............................ 250/225; 356/351
[58] Field of Search ............. 250/225, 227.17, 227.19, 250/227.27; 356/351, 345, 346, 367, 368, 369

[56] References Cited

U.S. PATENT DOCUMENTS

| | | | |
|---|---|---|---|
| 3,604,811 | 7/1969 | McMenmin | 356/368 |
| 4,516,855 | 5/1985 | Korth | 356/367 |
| 4,653,915 | 3/1987 | Frigo et al. | 250/225 |

OTHER PUBLICATIONS

C. Hentschel, "Polarization Control", Fiber Optics Handbook, Boeblingen Instruments Division, F.R. Germany, pp. 163–166.

G. McDearmon, "Theoretical Analysis of a Push-Pull Fiber-Optic Hydrophone", Journal of Lightwave Technology, IEEE, vol. LT-5, No. 5, May 1987, pp. 647–652.

N. J. Frigo et al., "Technique for Elimination of Polarisation Fading in Fibre Interferometers", Electronics Letters, 12, vol. 20, No. 8, Apr. 1984, pp. 319–320.

H. C. Lefevre, "Single-Mode Fibre Fractional Wave Devices and Polarisation Controllers", Electronics Letters, 25, vol. 16, No. 20, Sep. 1980, pp. 778–780.

Primary Examiner—David C. Nelms
Attorney, Agent, or Firm—Lynn & Lynn

[57] ABSTRACT

A photodetector includes a polarizer array and an array of photodetector elements. The polarizer array includes a plurality of polarizers having axes of polarization spaced apart by selected angles such that each optical signal incident on the polarizer array has a polarization component along at least one of the axes of polarization. The array of photodetector elements is arranged such that each of the photodetector elements receives light from a selected one of the polarizers. At least one of the photodetector elements receives parallel polarization components from the optical signals to form an electrical signal indicative of interference between the optical signals.

1 Claim, 3 Drawing Sheets

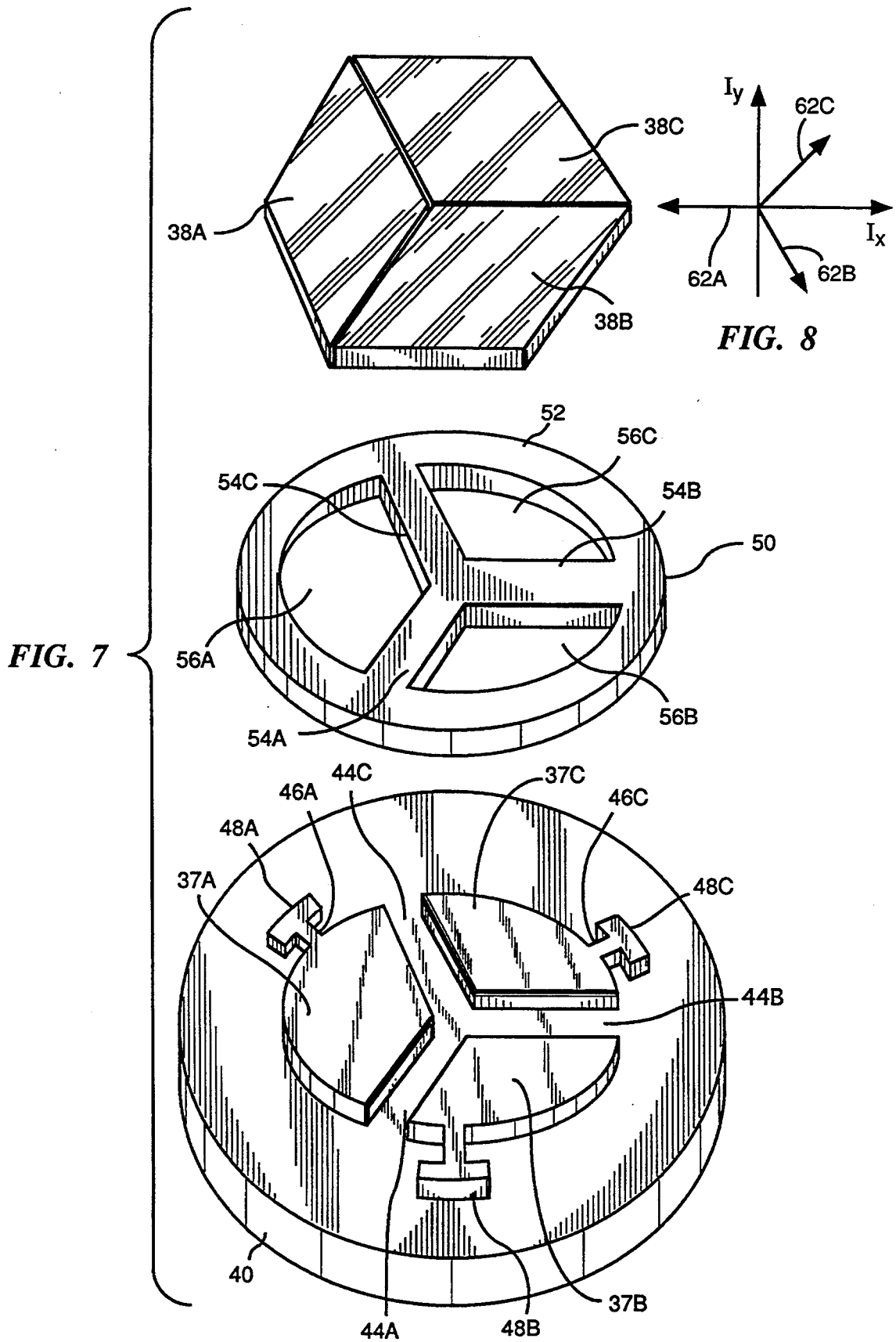

OPTICAL SIGNAL DETECTION APPARATUS AND METHOD FOR PREVENTING POLARIZATION SIGNAL FADING IN OPTICAL FIBER INTERFEROMETRIC SENSOR SYSTEMS

BACKGROUND OF THE INVENTION

This invention relates generally to fiber optic acoustic sensors and particularly to fiber optic acoustic sensors for underwater use. Still more particularly, this invention relates to apparatus and methods for preventing polarization signal fading in a fiber optic interferometric sensor used as a hydrophone.

A single mode optical fiber is capable of guiding signals of two linear polarizations. In a fiber optic hydrophone comprised of fiber optic interferometric sensors, the output signal may be a function of the polarization of the optical signals guided by the optical fibers in the sensors. Generally the maximum signal is obtained if the two fibers guide signals of the same polarization state.

A major problem of fiber optic interferometric sensors is loss of signal due to signal fading caused by changes in the polarization of the waves guided by the fibers. Drift in the relative optical path length difference in the interferometer arms causes a change in the relative state of polarization of the two interferometer arms. This may also be viewed as a change in the interference phase, which changes the signal intensity. Complete polarization fading occurs when the polarizations are orthogonal. In prior art systems, polarization signal fading may degrade the signal intensity to the point that no usable information is available.

Polarization fading and strumming noise have been observed regularly in sea trials of fiber optic towed hydrophone arrays. Polarization fading in such hydrophone arrays occurs when the two fibers that comprise the hydrophone have orthogonal polarization components. Polarization fading may reduce the fringe visibility in the output of interferometric sensors to zero. All hydrophone signal information then disappears.

A fiber optic polarization controller has been used to overcome the problem of polarization signal fading. This polarization controller has a plurality of loops of the optical fiber wound on spools whose edges are mounted on a common axis. The axis lies in the plane of each coil. Adjusting the angles of the loops of optical fiber adjusts the polarization state of the optical signal guided by the fiber.

Birefringence can be induced in a single mode optical fiber by bending the fiber into a coil. Bending an optical fiber causes an increase in the material density in the place perpendicular to the plane of the coil, which increases the refractive index in that plane. Changes in the refractive index in the plane of the coil are negligible due to the opposite effect of compression on the interior and tension on the exterior part of the curvature. The stress, and therefore the change in the refractive index, is essentially constant across the fiber core. In an isotropic material the change in refractive index may be expressed as:

$$\Delta n = \frac{n^3}{4}(1+\sigma)(p_{12} - p_{11})\left(\frac{r}{R}\right)^2 \quad (1)$$

where:

n is the refractive index;
s is the Poisson ratio;
$p_{11} - p_{12}$ are components of the photoelastic tensor;
r is the radius of the fiber; and
R is the radius of curvature of the bend.

For silica s=0.16, $p_{11}$=0.121, $p_{12}$=0.270 and n=1.46 at wavelength $\lambda$=633 nm. Using these values, Equation (1) reduces to:

$$\Delta n = a\left(\frac{r}{R}\right)^2 \quad (2)$$

where a is a constant and is equal to 0.133.

Using Equation (2) one may calculate the radius of curvature R of a single fiber loop for any selected phase delay. For example, the requirement for a quarter wave plate is 90° phase difference, and the radius R may be calculated as follows:

$$\Delta\beta 2\pi R = \frac{\pi}{2}; \quad (3)$$

$$\Delta\beta = 2\pi \frac{\Delta n}{\lambda} \quad (4)$$

where $\Delta\beta$ is the difference of propagation constants for the two possible linear polarizations and $\lambda$ is the wavelength in air.

The radius of curvature R may then be written as:

$$R = 8\pi a \frac{r^2}{\lambda}. \quad (5)$$

For a wavelength of 1300 nm the value of R is about 10 mm. Rotating one of the coils simply rotates the fast and slow axes of the loop with respect to the input electric field. If a conversion of an arbitrary input polarization state to an arbitrary output polarization is desired, then combination and proper orientation of two loops of the polarization controller provides the desired transformation.

The prior art has the disadvantage of requiring a manual adjustment every few minutes. This is not practical for a multi-sensor array that may contain seven or more sensors because such an array would be cumbersome and bulky.

SUMMARY OF THE INVENTION

The present invention provides a detection system that prevents signal fading in fiber optic interferometric sensor systems.

A photodetector according to the present invention for receiving optical signals of unknown polarization and producing electrical signals indicative of interference between the two optical signals of an interferometer includes a polarizer array arranged to receive the optical signals. The polarizer array comprises a plurality of polarizers having axes of polarization spaced apart by selected angles such that both optical signal have a polarization component along at least one of the axes of polarization. The photodetector further includes an array of photoelectric elements arranged such that each of the photoelectric elements receives light from only one of the polarizers. At least one of the photoelectric elements receives parallel polarization components from the optical signals to form an electrical signal indicative of interference between two optical signal components. The polarizers are preferably spaced apart from the photoelectric elements.

An appreciation of the objectives of the present invention and a more complete understanding of its structure and method of operation may be had by studying the following description of the preferred embodiment with reference to the accompanying drawings.

BRIEF DESCRIPTION OF THE DRAWINGS

FIG. 7 is a exploded perspective view of a photodetector according to the present invention showing active areas, a ceramic stand off and polarizers; and FIG. 8 illustrates the orientation of the polarization axes of the polarizers of FIG. 7 relative to two orthogonal linear polarizations.

DESCRIPTION OF THE PREFERRED EMBODIMENT

Figure 1:
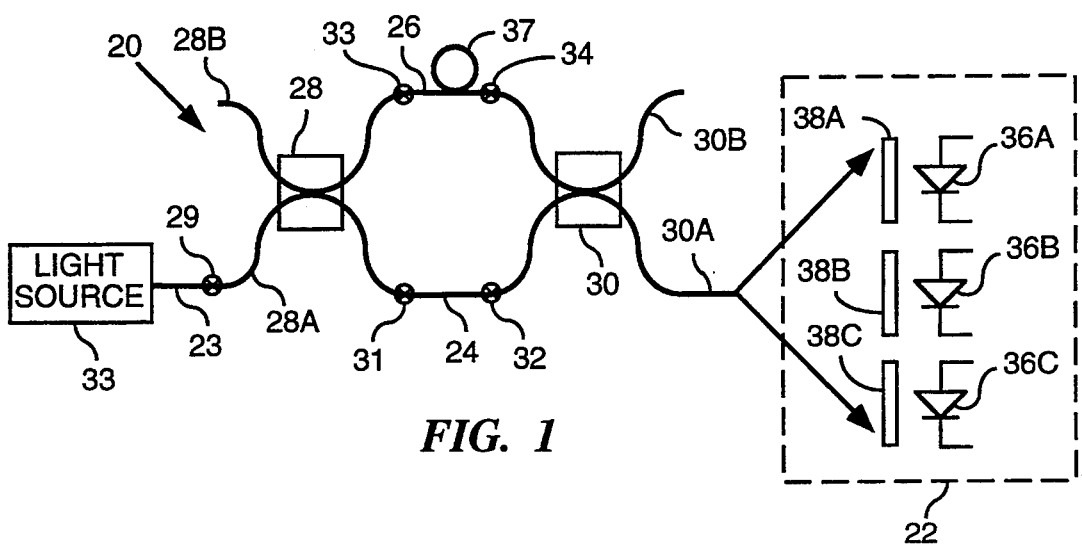
FIG. 1 schematically illustrates a fiber optic Mach-Zehnder interferometer arranged to supply optical signals to a photodetector assembly formed according to the present invention.

FIG. 1 illustrates a Mach-Zehnder interferometer 20 arranged to provide an optical signal output to a photodetector assembly 22 according to the present invention. The Mach-Zehnder interferometer 20 is illustrative of a fiber optic sensor that may be used with the photodetector assembly 22. Other devices, such as a Michelson interferometer (not shown) may be used to provide signals to the photodetector assembly 22. The following description of the photodetector assembly 22 according to the present invention as used with the Mach-Zehnder interferometer 20 should not be understood to limit the scope of the invention to any particular type of fiber optic sensor.

The Mach-Zehnder interferometer 20 includes a pair of optical fibers 24 and 26 connected between a pair of fiber optic couplers 28 and 30. The optical fibers 24 and 26 form arms of the Mach-Zehnder interferometer 20. The optical fiber 24 is sometimes referred to as the reference arm of the Mach-Zehnder interferometer 20, and the optical fiber 26 is sometimes referred to as the sensing arm.

The optical coupler 28 includes a pair of optical fibers 28A and 28B arranged so that light will couple therebetween. Similarly, the optical coupler 30 includes a pair of optical fibers 30A and 30B. All of the optical fibers in the described embodiment of the invention are preferably ordinary single-mode, non-polarization-maintaining fibers. The fiber optic couplers 28 and 30 preferably are evanescent field couplers.

The fiber 24 is connected between the fibers 28A and 30A at splices 31 and 32, respectively. The fiber 26 is connected between the fibers 28B and 30B at splices 33 and 34, respectively.

A light source 35 provides optical power via an optical fiber 23 to an input port of the coupler 28. The optical fiber 23 is spliced to the optical fiber 28A at a splice 29. The coupler 28 is typically a 50/50 coupler characterized to evenly divide the optical power from the input port into beams that propagate through the arms 24 and 26 of the interferometer. Both of the optical fibers 24 and 26 guide the respective signal beams to first and second input ports, respectively, of the coupler 30, which is also typically a 50/50 coupler.

The second fiber optic coupler 30 combines the first and second signal beams and outputs the combined beams via optical fiber 30A onto the photodetector assembly 22. The fiber optic sensing arm 26 includes a coiled portion 37 so that the optical length of the fiber optic sensing arm 26 between the couplers 28 and 30 is longer than the fiber optic reference arm 24. The first and second signal beams guided by the respective fiber optic arms 24 and 26 follow optical paths of different lengths so that there is a phase difference between the signal beams when the beams are combined in the fiber optic coupler 30. The combined signals propagate via the optical fiber 30A to the detector assembly 22 as shown in FIG. 1.

If the two signal beams in the optical fibers 24 and 26 have the same polarization state at coupler 30, then the signals interfere to form a fringe pattern of bright and dark lines that are monitored by a photodetector. However, when the two signal beams in the fiber optic arms 24 and 26 have orthogonal polarization states, no fringe pattern is produced.

Referring to FIG. 1, exposing the coiled portion 37 of the fiber optic sensing arm 26 to a change in the environmental parameters, such as acoustic pressure, changes the fringe pattern that is incident on the photodetector assembly 22. The value of the monitored signal may be continuously observed by processing the output of the photodetector assembly 22.

Referring to FIGS. 2-7, the photodetector assembly 22 according to the present invention is shown to include three photodetector elements 37A, 37B and 37C. The light beam output from the optical fiber 30A spreads out to impinge upon three polarizers 38A, 38B and 38C, which are placed between the end of the optical fiber 30A and the photodetector elements, 37A, 37B and 37C, respectively. Each of the three photodetector elements 37A, 37B and 37C includes an active area that preferably is formed to comprise an InGaAs photodiode. Such photodiodes are well-known and are commercially available.

Figure 2:
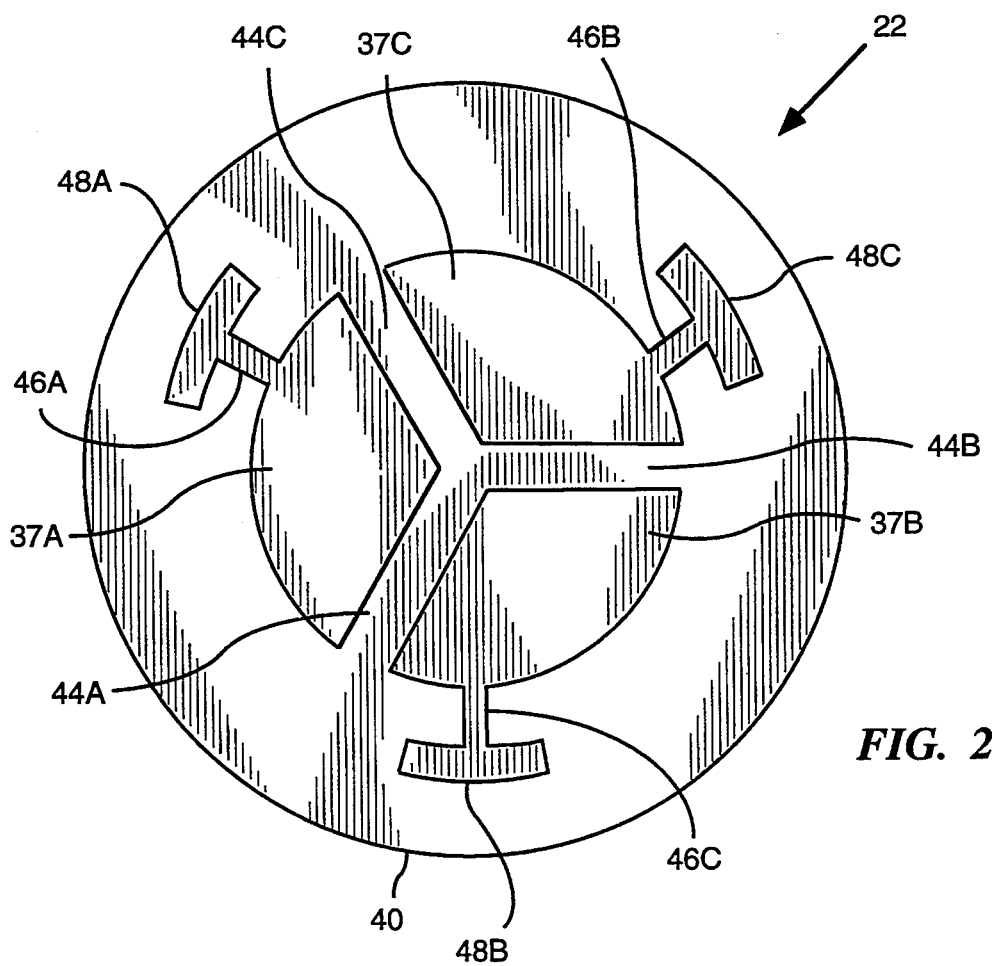
FIG. 2 is a plan view showing photodetector elements that may be included in the photodetector assembly of FIG. 1.
Figure 3:
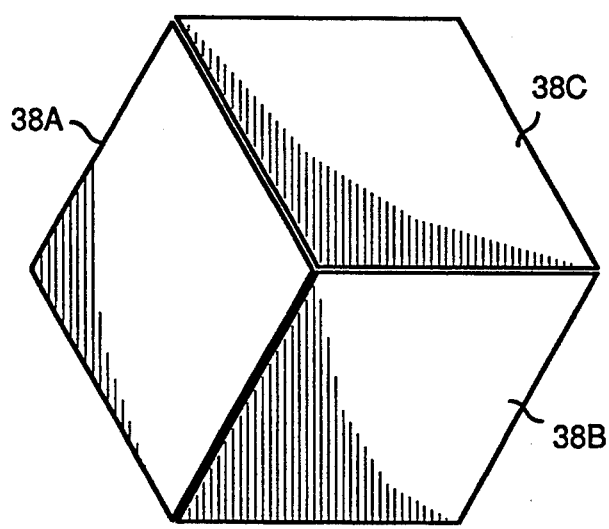
FIG. 3 is a plan view showing polarizers that may be included in the photodetector assembly of FIG. 1.

In the embodiment shown in FIG. 2, the active areas 37A, 37B and 37C preferably are separated by 0.25 mm gaps 44A, 44B and 44C formed on the substrate 40. Each of the active areas of the 37A, 37B and 37C is preferably formed as a 120° sector of a circular area. The diameter of the circle preferably is about 1.8 millimeters.

The photodetector element 37A includes a conductive strip 46A that extends generally radially outward from the active area 37A to the outer edge. The photodetector elements 37B and 37C include conductive strips 46B and 46C, respectively, that are similar to the conductive strip 46A. A wiring pad 48A extends from the outer end of the conductive strip 46A so that an electrical conductor (not shown) may be connected to the active area of the photodetector element 37A to carry electrical signals therefrom. Similarly, the conductive strips 46B and 46C have wiring pads 48B and 48C, respectively, connected thereto.

The photodetector assembly 22 further includes a standoff 50. The stand-off includes a peripheral ring 52 and three spoke-like members 54A, 54B and 54C that enclose holes 56A, 56B and 56C. The holes 56A, 56B and 56C align with the active areas 37A, 37B and 37C and preferably have the same general shape. The holes 56A, 56B and 56C and the active areas 37A, 37B and 37C are shown to be formed to have upper and lower surfaces that are sectors of circles. The ceramic standoff 50 has a thickness of about 0.35 mm. The ring 52 preferably has inner and outer diameters of is about 1.83 mm 2.3 mm, respectively.

Figure 4:
FIG. 4 is a front elevation view of the polarizers of FIG. 3.
Figure 5:
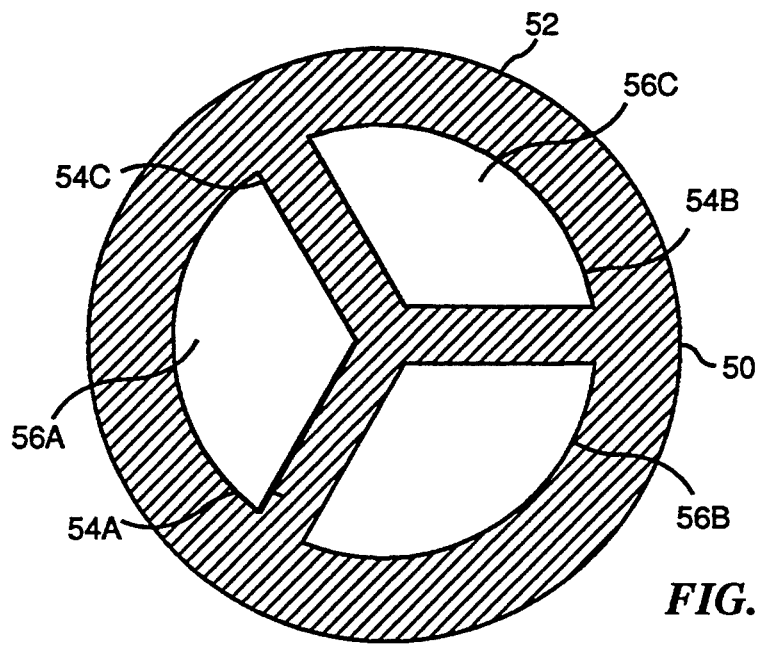
FIG. 5 is a plan view of a ceramic stand-off that may be included in the photodetector assembly of FIG. 1.
Figure 6:
FIG. 6 is a front elevation view of the ceramic stand-off of FIG. 5.

Referring to FIG. 4, each polarizer 38A, 38B and 38C may be formed as a parallelogram having sides that are typically 1.4 mm in length. Each polarizer may have a thickness of about 0.5 mm.

Referring to FIG. 7, the polarizers 38A, 38B, and 38C are placed between the end of the fiber 24 and the active areas 37A, 37B and 37C of the photodetector assembly 22. Each of the polarizers 38A, 38B, and 38C is formed and arranged to have a transmission axis that makes an angle of 120° with respect to the transmission axis of the adjacent polarizer. Therefore, an incident signal of any polarization will have parallel polarization components that are incident upon at least one of the active areas 37A, 37B and 37C, respectively, of the photodetector assembly 22. Therefore at least one of the active areas 37A, 37B and 37C, respectively, of the photodetector assembly 22 will have interfering optical signals thereon and will produce an electrical signal indicative of the light intensity in the resulting interference fringe pattern.

Referring to FIG. 8, the arrows 62A, 62B and 62C indicate that the three transmission axes of the polarizers are 120° apart. An optical signal that has orthogonal polarization components $I_x$ and $Z_y$ in the horizontal and vertical directions, in the plane of the paper in FIG. 8, has common components along the transmission axes of the polarizers 38B and 38C. The active areas 37B and 37C would produce an electrical signal in response to an incident signal having the indicated polarization. The active area 37A would not produce an interference signal because only the component $I_x$ would pass through the polarizer 38A.

Referring to FIG. 4 and 7, the polarizers 38A, 38B, and 38C cover the active areas 37A, 37B and 37C of the photodetector assembly 22. The stand-off 50 is placed between the polarizers 38A, 38B, and 38C and the substrate 40 of the photodetector assembly 22. The standoff 50 preferably comprises an opaque ceramic material. The stand-off 50 functions to support the polarizers 38A, 38B, and 38C, preventing them from coming into contact with the active regions 37A, 37B and 37C. The stand-off 50 also optically isolates each cell 37A, 37B and 37C of the photodetector assembly 22 from the other cells.

Each of the polarizers 38A, 38B, and 38C is preferably made of a linear polarizing thin glass plate as illustrated in FIGS. 4 and 7. The thickness of each glass plate preferably is about 0.5 mm. The polarizers 38A, 38B, and 38C are polished and cut to a specific orientation that allows their transmission axes to be placed 120° apart with respect to each other whens they are put together. Optical power through each polarizer is proportional to $COS^2 \theta$ where $\theta$ is the angle between the plane of polarization and the polarizer transmission axis.

The polarizers 38A, 38B and 38C and the ceramic standoff 50 preferably are cemented together. The polarizers 38A, 38B and 38C and the ceramic standoff 50 are then placed on the designated region on the photodetector assembly 22 and cemented in place. The entire assembly is then preferably encapsulated in a detector housing, such as a TO-5 can, (not shown) and hermetically sealed.

The housing is preferably made from aluminum, and it accommodates the detector assembly 22 and the optical fiber 27. The housing is designed so that it will automatically align the optical fiber 30A and place it at a predetermined distance from the face of the photodetector 22 in order to cover the active areas 37A, 37B and 37C with the optical signals output from the fiber 30A. Both the fiber holder and detector are designed to be cemented to the housing. This compact assembly can then be mounted on a printed circuit board (not shown).

As shown in FIG. 1, the output from the interferometer 20 covers the entire area of the polarizers 38A, 38B and 38C in the detector assembly 22. The arrangement of the polarizers 38A, 38B and 38C and tri-segment detector provides a device that will eliminate complete signal fading due to polarization drifts in a fiber optic interferometric sensor. Calculations have shown that the minimum number of polarizer/detector channels required is three because it is impossible that all three channels simultaneously fade to produce a null signal output. The polarizations of optical signals emitted from the optical fiber 30A will have common components along the polarization axis of at least one of the polarizers.

The present invention has the advantage of being operator-free because there is no need for manual adjustment to any part of the device. The photodetector 22 according to the present invention is practical for multi-sensor arrays and is rugged and compact. The present invention may be hermetically sealed and it eliminates total polarization fading and reduces the polarization-induced phase noise (strumming noise).

The structures and methods disclosed herein illustrate the principles of the present invention. The invention may be embodied in other specific forms without departing from its spirit or essential characteristics. In particular, it is possible to form the photodetector with more than three segments. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A photodetector for receiving optical signals of unknown polarization and producing electrical signals indicative of interference between the optical signals, comprising:

a polarizer array arranged to receive the optical signals, the polarizer array comprising three polarizers configured as parallelograms having axes of polarization spaced apart by 120° angles such that each optical signal incident upon the polarizer array has a polarization component along the axis of polarization of at least one of the three polarizers;

an array of three photoelectric elements arranged to correspond to the polarizers such that each of the photoelectric elements receives light from a selected one of the polarizers, at least one of the photoelectric elements receiving parallel polarization components from the optical signals to form an electrical signal indicative of interference between the optical signals; and an opaque stand-off positioned between the polarizer array and the array of photoelectric elements, the stand-off being formed to a peripheral ring and an array of three openings that are in axial alignment with corresponding photoelectric elements and polarizers, the stand-off being formed to support the polarizer array, to prevent contact between the photoelectric elements and the polarizers and to optically isolate the three photoelectric elements from each other.

* * * * *